Figure 1:
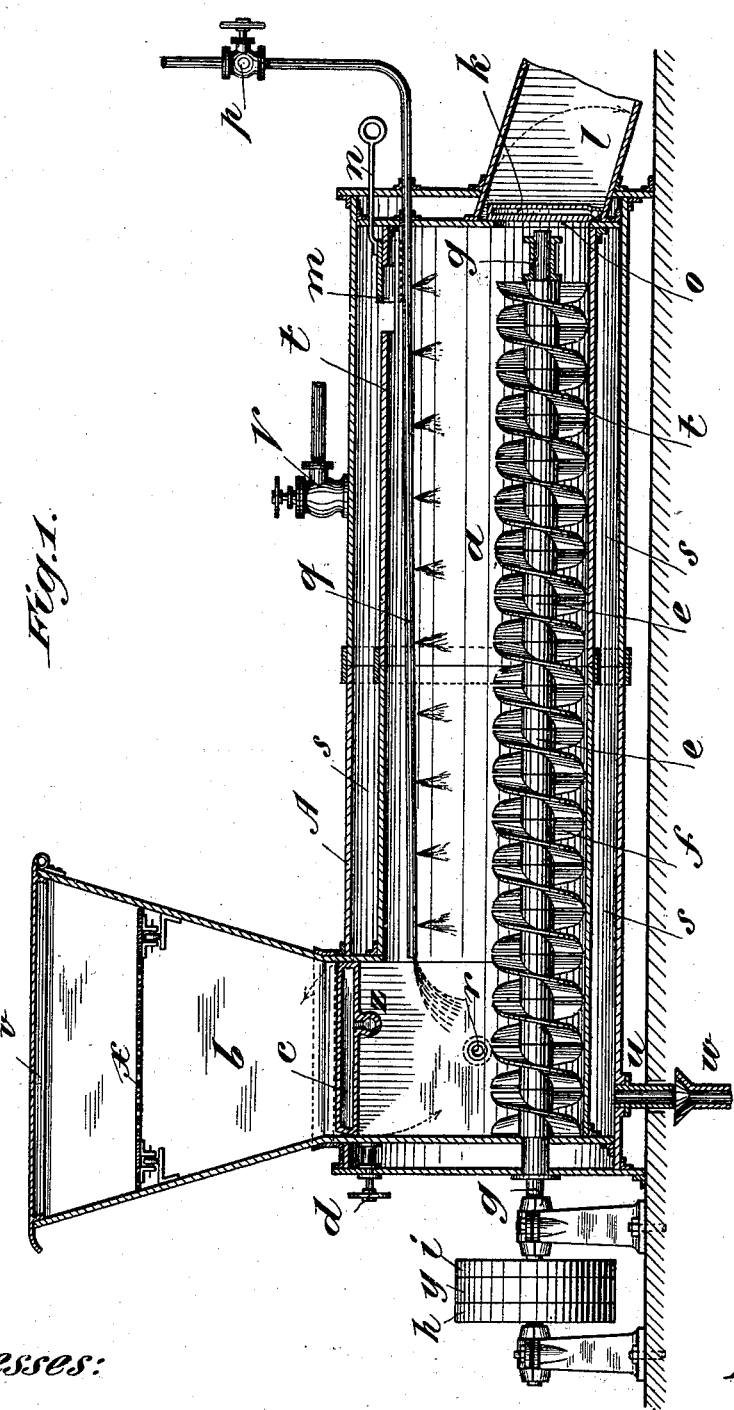

No. 664,440. Patented Dec. 25, 1900.
W. SCHULTHESS.
APPARATUS FOR SLAKING LIME.
(Application filed July 30, 1900.)

(No Model.) 3 Sheets—Sheet 2.

Witnesses:

Inventor:
Walter Schulthess.

No. 664,440. Patented Dec. 25, 1900.
W. SCHULTHESS.
APPARATUS FOR SLAKING LIME.
(Application filed July 30, 1900.)

(No Model.) 3 Sheets—Sheet 3.

Witnesses: Inventor:
Walter Schulthess.

United States Patent Office.

WALTER SCHULTHESS, OF ZURICH, SWITZERLAND.

APPARATUS FOR SLAKING LIME.

SPECIFICATION forming part of Letters Patent No. 664,440, dated December 25, 1900.

Application filed July 30, 1900. Serial No. 25,304. (No model.)

*To all whom it may concern:*

Be it known that I, WALTER SCHULTHESS, a citizen of the Republic of Switzerland, residing at Zurich, Switzerland, have invented certain new and useful Improvements in Apparatus for Slaking Lime; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The slaking of burnt lime to form calcium hydrate in the form of powder is usually effected by placing it in heaps, sprinkling it with approximately the necessary quantity of water, and leaving it to itself for a protracted period of time. The burnt lime, if the proper quantity of water has been added, is converted by the resulting slaking into powder, the reaction being accompanied by great evolution of heat. The powder varies greatly as to its chemical capacity to combine with sand according to whether a greater or smaller quantity of water is employed, since it contains water in greater or less quantity combined physically and possibly chemically. This method of slaking requires a considerable period of time for carrying it out. Moreover, it always yields a product partially decomposed by atmospheric carbonic acid, and its quality is wholly dependent on the degree of care with which the slaking is effected. It is hardly possible to obtain complete slaking by this method, as the mass cannot be frequently shoveled over, because of the immense amount of dust produced.

The mechanical apparatus hitherto employed for slaking lime consist either of cylinders which are provided with simple stirring appliances and in which the burnt lime is slaked with water or of pressure-chambers into which the burnt lime is run in trucks and after the chambers have been closed subjected to the action of high-pressure steam. In the first case it is impossible correctly to apportion the quantity of water requisite for slaking the lime, both on chemical and physical grounds, and the result is that either part of the lime is not slaked at all or is wetted too much, so that a lumpy product is obtained, which in many cases is quite useless. The method of slaking the lime in trucks in a pressure-chamber is very incomplete, as under these circumstances any turning over of the mass is utterly out of question and the lime has to be brought in in trucks to prevent the calcium hydrate produced from becoming wetted by the condensation-water running down the walls of the chamber, and consequently becoming lumpy. This method of slaking in pressure-chambers, moreover, is not only very complicated, but also very expensive, and for these reasons has not been able to make way in practice. Now in my apparatus slaking that has been only partially effected with water is completed by adding hot aqueous vapor or steam, (hereinafter referred to as "steam.") This slaking is carried out in a vessel surrounded on all sides by a jacket-space heated to at least 97° centigrade. This prevents steam from condensing in the vessel containing the lime, so that even if an excess of steam is admitted no possible injurious effects can result, as hereinbefore described.

An example of apparatus according to this invention is represented in the accompanying drawings, in which like parts are similarly designated.

Figure 2:
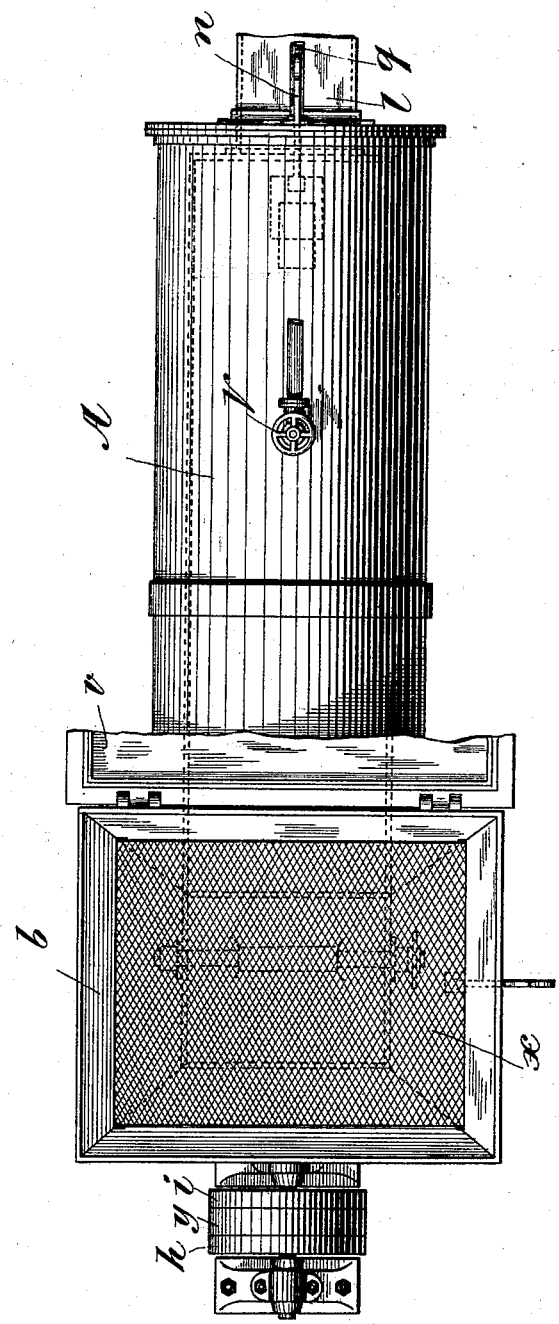
Figure 3:
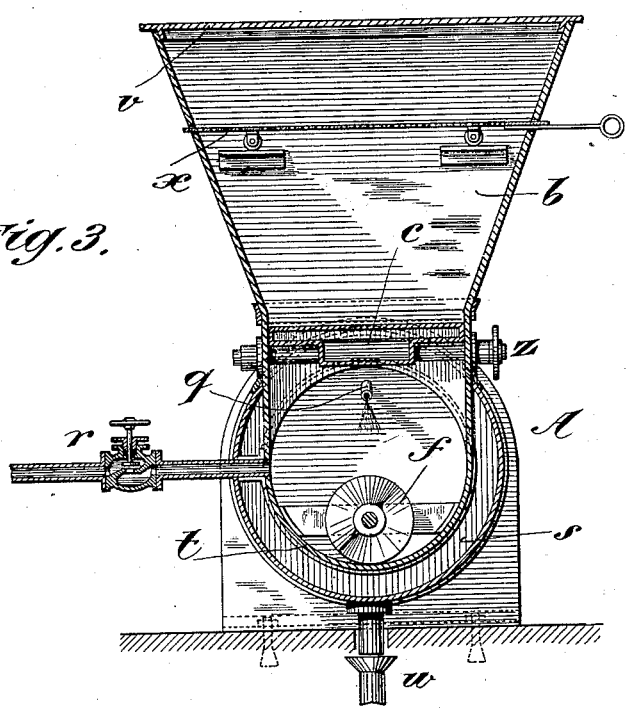
Figure 4:
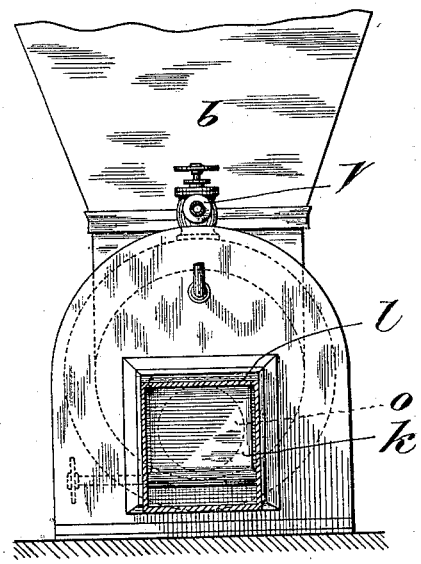

Figure 1 is a vertical longitudinal section; Fig. 2, a top plan view; Fig. 3, a vertical cross-section through the hopper, and Fig. 4 an end view.

A horizontal or approximately horizontal cylinder $a$, closed on all sides and made of thin sheet-iron, carries at one end a hopper $b$, with which it can be placed in communication by means of a small sheet-iron box $c$, mounted on pivots $z$. This iron box is filled with badly-conducting material, as sawdust or ashes, or it may be filled with steam. In the latter case the steam is advantageously admitted at one end of the axle and allowed to escape at the other.

$d$ represents a small sliding catch provided with a handle for keeping the box $c$ closed.

In its lower part the cylinder $a$ is traversed throughout its whole length by a shaft $e$, on which mixing and conveying blades $f$ are mounted. This shaft rotates in bearings $g$ by means of driving-pulleys $h$ and $i$, which can be rotated in opposite directions.

$y$ represents a loose pulley.

At the opposite end to the hopper the cylinder $a$ has an opening $o$, which can be closed by means of a hinged door $k$ (see Fig. 4) and from which leads a sheet-metal chute $l$, Fig. 1, through which the finished product can be delivered. This cover $k$ may likewise be formed of a small iron box filled either with some badly-conducting material or with steam admitted by a pipe passing through its axle. The condensation-water is led off through the other end of the axle. The cylinder $a$ is also provided with an opening $m$, that can be closed by a sliding valve $n$, and with a water-pipe $q$, furnished with a valve $p$ and provided with rose-like or jet perforations.

$r$ represents a steam-pipe that can be closed by means of a valve.

In the upper part of the hopper $b$ is arranged a shaker-sieve $x$, to which reciprocating motion can be imparted by suitable means. The hopper $b$ can be closed, so as to be dust-tight, by means of a lid $v$, mounted on hinges.

The first cylinder $a$ is on all sides surrounded by and separated by a chamber or jacket-space $s$ from a second and separate cylinder A, also of sheet-iron and made steam-tight in any suitable manner. Beneath and advantageously near to the steam-pipe $r$ the cylinder A is provided with an escape-pipe $u$. $w$ represents the pipe for carrying off the condensation-water and steam escaping from the pipe $u$. The cylinder A is also provided in the middle with a steam-valve V, by opening which the space $s$ can be filled with steam. The closing of the opening $o$ by the cover $k$, as well as that of the valve $c$, should be as perfect as practicable.

The mode of operation of this apparatus is as follows: A definite charge of burnt lime—the charge is always of the same amount—is placed on the sieve $x$ (the valve $c$ having been first closed) and sprinkled with a portion of the quantity of water (previously calculated) approximately necessary for slaking it, and the lid $v$ is then closed. In a short time the lime is partially slaked—i. e., it has fallen into a mixture of fine powder and larger pieces. By operating the shaker-sieve, which is mounted on rollers, the finer portions are separated from the larger pieces, which also fall through the sieve after being again sprinkled with water. When this has been accomplished, the valve V is first opened until a small quantity of steam escapes from the pipe $u$. Then the valve $c$ is opened, and the sliding damper $n$ being closed the mixing and conveying blades are set into motion by means of the driving-pulley $i$. The lime is thus carried forward in the cylinder $a$ (the valve $k$ being closed) and spread out therein fairly uniformly. The pulley $i$ is then thrown out of gear, and after opening $m$ and closing V the remainder of the quantity of water hereinbefore mentioned is admitted by means of the rose-like water-pipe. The steam evolved during the slaking operation is compelled after passing through the opening $m$ to envelop the cylinder $a$ completely before it can escape at $u$. When no more steam escapes from the opening $m$, dry steam is admitted through the steam-pipe $r$ into the vessel $a$ in such quantity that, mixed with condensation-water, it escapes slightly from the opening $m$. The contents of the vessel $a$ are mixed together from time to time (the steam-pipe $r$ and the damper $n$ being closed) by working the mixing and conveying blades first forward and then backward. The steam-pipe and the damper must be kept closed, as otherwise the motion of the mixing-blades would drive the very fine and quite dry calcium hydrate into the space between the cylinders and there form a crust, which, however, could be easily removed. When the slaking operation has been completed by alternate mixing and addition of steam, the lime-receptacle is emptied by the chute $l$ by setting the pulley $i$ into motion. The calcium hydrate is conveyed by means of an elevator to a sifting-machine, which separates out any particles of unburnt lime that may be present. The whole operation of slaking can be carried out without raising any dust, and only gross neglect can endanger the high quality of the resulting product.

Slaking such as hereinbefore described may be effected with the aid of superheated steam, whether under pressure or not under pressure. In the first case both cylinders are constructed as pressure vessels and made to close steam-tight and the inner receptacle is not provided with means for communicating with the jacket-space. When superheated steam is employed, whether under pressure or not, the temperature of the jacket-space must at least be equal to that of the vessel containing the lime. In some cases the jacket-space may even be heated to a higher temperature than that of the lime-containing vessel.

Having now particularly described and ascertained the nature of my said invention and in what manner the same is to be performed, I declare that what I claim is—

1. A mixing apparatus, comprising a suitable vessel, a hopper organized to dump its charge into said vessel, means in said hopper for sifting material and a conveyer arranged to move material from end to end in said vessel, substantially as set forth.

2. A mixing apparatus, comprising a steam-jacketed vessel, a hopper at one end thereof, a dumping-bottom for said hopper and a shaking-screen above the bottom, means for supplying water and steam to the vessel and a conveyer organized to carry material from end to end in said vessel, substantially as set forth.

3. A mixing apparatus, comprising a jacketed vessel, a hopper organized to dump into said vessel, a conveyer in the bottom thereof arranged to carry material from end to end in said vessel and means for feeding water to the material in the conveyer, substantially as set forth.

4. A mixing apparatus comprising a jacketed vessel, a hopper at one end thereof organized to dump into said vessel, a jet-pipe in the latter, a conveyer organized to carry material from end to end under said jet-pipe and means for discharging gases formed during mixing into the jacket-space of said vessel, substantially as set forth.

5. A mixing apparatus comprising a jacketed vessel, a closed hopper organized to dump into one end thereof, a jet-pipe within the vessel extending from one end to the hopper, a conveyer in the bottom of said vessel arranged to carry material from end to end of the vessel under the jet-pipe, means for discharging gases formed during the mixing into the jacket-space and means for admitting steam into the vessel and jacket-space, substantially as set forth.

6. A mixing apparatus comprising a jacketed vessel, a closed hopper at one end thereof, means for sifting and dumping the hopper charge into the vessel, a steam-supply for the interior of the vessel, and a separate steam-supply for the jacket-space, a spray-pipe in the vessel, a conveyer constructed to move the material from end to end under said spray-pipe, a damper closing communication between the vessel and jacket-space, and a discharge-opening at the end of the conveyer, substantially as described.

In testimony that I claim the foregoing as my invention I have signed my name in presence of two subscribing witnesses.

WALTER SCHULTHESS.

Witnesses:
 EMIL BLUM,
 A. LIEBERKNECHT.